L. G. COPEMAN.
GREASE CUP.
APPLICATION FILED NOV. 9, 1917.

1,287,889. Patented Dec. 17, 1918.

Lloyd G. Copeman Inventor

By Stuart C. Barnes
his Attorney

Witness

UNITED STATES PATENT OFFICE.

LLOYD G. COPEMAN, OF FLINT, MICHIGAN, ASSIGNOR TO COPEMAN DEVELOPMENT COMPANY, OF FLINT, MICHIGAN, A CORPORATION OF MICHIGAN.

GREASE-CUP.

1,287,889.　　　Specification of Letters Patent.　　Patented Dec. 17, 1918.

Application filed November 9, 1917.　Serial No. 201,029.

*To all whom it may concern:*

Be it known that I, LLOYD G. COPEMAN, a citizen of the United States, residing at Flint, in the county of Genesee, State of Michigan, have invented a new and useful Improvement in Grease-Cups, of which the following is a specification.

This invention relates to grease cups and capsules and has for its object a grease cup which is adapted to eject a collapsible capsule when the grease has been used out of the same. Several ways of getting the grease capsule when it is collapsed, out of the grease cup, have been devised, which work usually on the principle of having a plunger in retreating out of the cup pick out the capsule.

The present invention relates to another way and a very efficient way of accomplishing this same result.

In the drawings,—

Figures 1, 2:
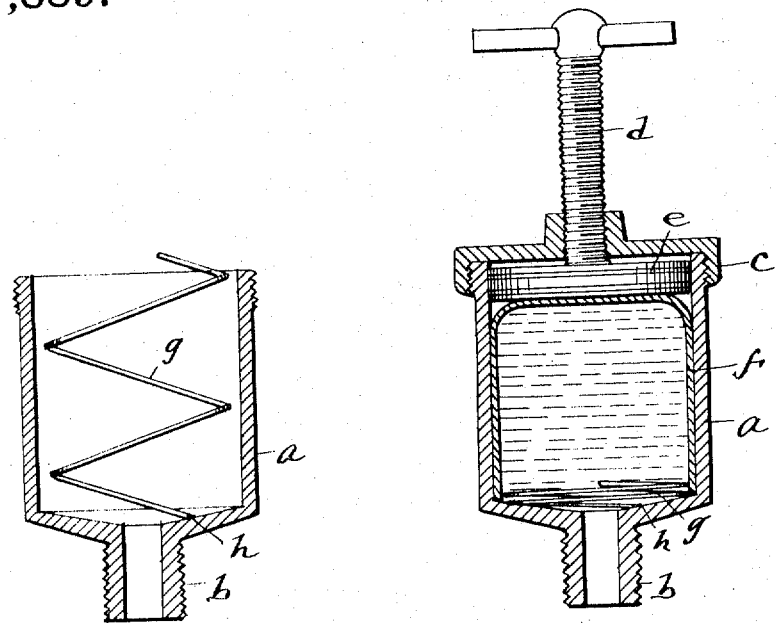
Figure 1 shows a grease cup with my invention in connection therewith.
Fig. 2 shows the grease cup with the cup and plunger removed and the spring distended.

*a* designates the grease cup with the usual body portion and nozzle portion *b*. The top of the cup is externally threaded to receive the usual cap *c*. Through the cap is threaded the plunger stem *d* on which is the plunger *e*. A collapsible capsule *f* of the character described in some of my prior patents and usually made out of some kind of paper is shown in the grease cup. The contents of the capsule pack or collapse the spring *g* when the same is inserted and the cap screwed down. This is well shown in Fig. 1. The normal position of this spring is a distended one, as shown in Fig. 2.

Figure 3:
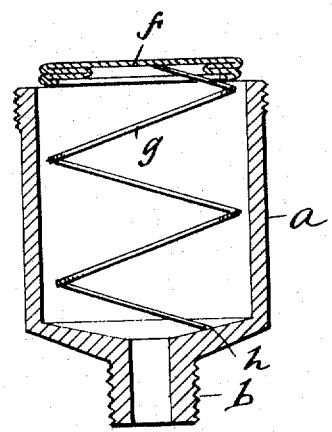
Fig. 3 is a similar view showing how, when the grease has been exhausted from the capsule and the plunger removed, the collapsed capsule is ejected.

Now obviously when the capsule has expelled practically all of its contents by reason of the pressure brought to bear upon it by the plunger *e* and when the plunger is withdrawn, the spring *g* rises and follows the plunger and at the same time carries up the collapsed capsule *f* so that it is either completely thrown out by the spring or else raised to the position shown in Fig. 3, where it may be easily grasped by the fingers and thrown away. The lower end of the spring may be soldered or otherwise fastened to the end of the body portion of the cup as at *h*.

This simple expedient serves to avoid the necessity of using some instrument to pick the capsule out of the grease cup when the grease has been expelled from it.

What I claim is:

1. A grease cup for holding a collapsible capsule, a cap therefor, a plunger or follower for said cup, and means located in the grease cup for expelling a collapsed capsule when the plunger and cap are removed.

2. In a device for the purpose specified, the combination of a grease cup for holding a collapsible capsule, a cap therefor, a plunger or follower, and collapsible, yieldable means for expelling a collapsible grease capsule when the plunger and cap are removed.

3. In a device for the purpose specified, the combination of a grease cup for holding a collapsible capsule, and collapsible, yieldable means located within the cup portion of the grease cup for expelling a collapsed capsule when the cup is opened up.

4. In a device for the purpose specified, the combination of a grease cup for holding a collapsible capsule, and a collapsible spring located in the grease cup for ejecting a collapsible capsule when the cup is opened.

5. In a device for the purpose specified, the combination of a grease cup for holding a collapsible capsule, a cap therefor, a plunger, and a coil spring having its inner end fastened to the bottom of the grease cup and acting to expel a collapsible capsule when the plunger and the cap are removed.

In witness whereof I have hereunto set my hand on the 29th day of October, 1917.

LLOYD G. COPEMAN.